United States Patent
Kim et al.

(10) Patent No.: US 9,397,369 B2
(45) Date of Patent: Jul. 19, 2016

(54) SEPARATOR FOR FUEL CELL, AND FUEL CELL SYSTEM INCLUDING SAME

(75) Inventors: Hee-Tak Kim, Yongin-si (KR); Sung-Yong Cho, Yongin-si (KR); Kah-Young Song, Yongin-si (KR); Tae-Yoon Kim, Yongin-si (KR); Sang-Il Han, Yongin-si (KR); Geun-Seok Chai, Yongin-si (KR); Myoung-Ki Min, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1325 days.

(21) Appl. No.: 13/197,563

(22) Filed: Aug. 3, 2011

(65) Prior Publication Data
US 2012/0034549 A1 Feb. 9, 2012

(30) Foreign Application Priority Data
Aug. 3, 2010 (KR) .................. 10-2010-0075055
Jun. 21, 2011 (KR) .................. 10-2011-0060247

(51) Int. Cl.
*H01M 2/14* (2006.01)
*H01M 10/0587* (2010.01)
*H01M 10/0525* (2010.01)

(52) U.S. Cl.
CPC ...... *H01M 10/0587* (2013.01); *H01M 10/0525* (2013.01); *Y02E 60/122* (2013.01); *Y02P 70/54* (2015.11)

(58) Field of Classification Search
CPC ........................................... H01M 2/14
See application file for complete search history.

(56) References Cited

U.S. PATENT DOCUMENTS

| | | | |
|---|---|---|---|
| 2005/0227126 A1 | 10/2005 | Korytnikov et al. | |
| 2006/0105218 A1* | 5/2006 | Ishikawa et al. ............... | 429/34 |
| 2007/0042249 A1 | 2/2007 | Kim et al. | |
| 2007/0254204 A1 | 11/2007 | Shin et al. | |
| 2008/0081224 A1 | 4/2008 | Burch et al. | |
| 2008/0102327 A1 | 5/2008 | Docter et al. | |
| 2008/0156369 A1 | 7/2008 | Ko et al. | |
| 2008/0187797 A1 | 8/2008 | Edlund | |
| 2008/0280174 A1 | 11/2008 | Ogawa et al. | |
| 2009/0029200 A1 | 1/2009 | Izutani et al. | |

(Continued)

FOREIGN PATENT DOCUMENTS

| | | |
|---|---|---|
| JP | 2010092638 | 4/2010 |
| KR | 10-2007-0022561 A | 2/2007 |

(Continued)

OTHER PUBLICATIONS

Korean Office Action issued on Mar. 13, 2013 by KIPO in connection with Korean Patent Application No. 10-2011-0060247 and Request for Entry of the Accompanying Office Action attached herewith.

*Primary Examiner* — Jacob Marks
(74) *Attorney, Agent, or Firm* — Robert E. Bushnell, Esq.

(57) ABSTRACT

A fuel cell separator and a fuel cell system including the same. The separator includes a main body including a plurality of cell barriers and a flow channel disposed between the cell barriers, and a hydrophilic surface-treatment layer disposed on the bottom surface of the flow channel of the main body. The hydrophilic surface-treatment layer disposed on the bottom surface of the flow channel has a contact angle less than a contact angle of a side surface of at least one of the cell barriers by approximately 10° to approximately 60°.

19 Claims, 2 Drawing Sheets

(56) References Cited

U.S. PATENT DOCUMENTS

2009/0191351 A1\* 7/2009 Owejan et al. ............... 427/446
2010/0239949 A1  9/2010 Maeda et al.

FOREIGN PATENT DOCUMENTS

| KR | 10-2007-0106199 A | 11/2007 |
| KR | 10-2008-0091471 A | 10/2008 |

\* cited by examiner

SEPARATOR FOR FUEL CELL, AND FUEL CELL SYSTEM INCLUDING SAME

CLAIM OF PRIORITY

This application makes reference to, incorporates into this specification the entire contents of, and claims all benefits accruing under 35 U.S.C. §119 from applications earlier filed in the Korean Intellectual Property Office filed on Aug. 3, 2010, and Jun. 21, 2011, and there duly assigned Serial Nos. 10-2010-0075055 and 10-2011-0060247, respectively.

BACKGROUND OF THE INVENTION

1. Field of the Invention

This disclosure relates to a separator for a fuel cell and a fuel cell system including the same.

2. Description of the Related Art

A fuel cell is a power generation system that produces electrical energy through an electrochemical redox reaction of an oxidant and hydrogen in a hydrocarbon-based material such as methanol, ethanol, or natural gas.

SUMMARY OF THE INVENTION

One aspect of the present invention provides an improved fuel cell separator.

Another aspect of the present invention provides a fuel cell separator that is capable of effectively operating a fuel cell by preventing mechanical failure due to freezing when storing at a temperature below 0° C., continuously supplying a fuel and an oxidizing agent at a cold start-up, and effectively discharging moisture during normal operation.

Still another aspect of the present invention provides a fuel cell system that includes the fuel cell separator.

According to one aspect of the present invention, a fuel cell separator is provided that includes a main body including a plurality of cell barriers and a flow channel disposed between the cell barriers, and a hydrophilic surface-treatment layer disposed on the bottom surface of the flow channel of the main body. The hydrophilic surface-treatment layer disposed on the bottom surface of flow channel has a contact angle less than a contact angle of a side surface of at least one of the cell barriers by about 10° to about 60°. The contact angle of the hydrophilic surface-treatment layer disposed on the bottom surface of the flow channel may be less than the contact angle of side surface of cell barrier by 15° to 40°.

The main body may include a metal, graphite, a carbon-resin composite, or a combination thereof. A surface of the main body may be pretreated by a method selected from a group consisting of UV irradiating polarization, plasma treatment, sand papering, corona treatment, rubbing, and a combination thereof.

A hydrophobic surface treatment may be applied to at least one of the side surface and a top surface of the cell barrier.

At least one of the side surface of the cell barrier and the top surface of the cell barrier may have a contact angle ranging from about 90° to about 160°.

The hydrophilic surface-treatment layer may have a contact angle ranging from about 0° to about 85°. The hydrophilic surface-treatment layer may include a hydrophilic functional group such as an hydroxy (—OH) group, a carboxyl (—COOH) group, an amine (—$NH_2$) group, a ketone (—CO—) group, an aldehyde (—CHO) group, a sulfonic acid (—$SO_3H$) group, a nitrate (—$NO_3$) group, a nitrile (—CN) group, an alkoxy (—OR, wherein R is a C1 to C20 aliphatic organic group) group, or a combination thereof. The hydrophilic surface-treatment layer may have an average thickness ranging from about 1 nm to about 100 nm.

According to another aspect of the present invention, a fuel cell system is provided that includes an electricity generating element, a fuel supplier that supplies the electricity generating element with a fuel, and an oxidant supplier that supplies the electricity generating element with an oxidant. The electricity generating element includes a membrane-electrode assembly including an anode, a cathode and a polymer electrolyte membrane interposed between the anode and the cathode, and a separator positioned at each side of the membrane-electrode assembly. When the separator is the same as described above, the electricity generating element generates electricity through electrochemical reactions of a fuel and an oxidant.

According to a further aspect of the present invention, a method for manufacturing a separator for a fuel cell contemplates preparing a fuel cell separator precursor including a main body comprising a plurality of cell barriers and a flow channel disposed between the cell barriers. forming a hydrophilic surface-treatment layer on a bottom surface of the flow channel, and washing and drying the main body formed with the hydrophilic surface-treatment layer. The hydrophilic surface-treatment layer disposed on the bottom surface of flow channel has a contact angle less than a contact angle of a side surface of at least one of the cell barriers by about 10° to about 60°.

The step of forming the hydrophilic surface-treatment layer on the bottom surface of the flow channel may include treating the fuel cell separator precursor with a compound including a hydrophilic functional group.

The compound with the hydrophilic functional group may be at least one selected from a group consisting of an acid compound and a compound including a functional group, the acid compound includes at least one selected from a group consisting of sulfuric acid, nitric acid, phosphoric acid and hydrochloric acid. The compound including the functional group includes at least one selected from a group consisting of a hydroxy (—OH) group, a carboxyl (—COOH) group, an amine (—$NH_2$) group, a ketone (—CO—) group, an aldehyde (—CHO) group, a sulfonic acid (—$SO_3H$) group, a nitrate (—$NO_3$) group, a nitrile (—CN) group, and an alkoxy (—OR, wherein R is a C1 to C20 aliphatic organic group) group.

The compound including the hydroxyl (—OH) group may include at least one selected from a group consisting of hydrogen peroxide ($H_2O_2$), water, sodium hydroxide, and potassium hydroxide. The compound including the carboxyl (—COOH) group may include at least one selected from a group consisting of acrylic acid, acetic acid, methacrylic acid, and itaconic acid. The compound including the amine (—$NH_2$) group may include at least one selected from a group consisting of ammonia, methyl amine, propyl amine, N-methyl-N-ethyl amine, N-ethyl amine, and N-methyl-N-propyl amine. The compound including the keton (—CO—) group may include at least one selected from a group consisting of cyclopropanone, and 3-butene-2-one. The compound including the aldehydeo (—CHO) group may include at least one selected from a group consisting of methylacryl aldehyde, formaldehyde, ethanol, and cinnamaldehyde. The compound including the sulfonic acid (—$SO_3H$) group may include at least one selected from a group consisting of sulfuric acid, trifluoromethane sulfonic acid, and benzene sulfonic acid. The compound including the nitrate (—$NO_3$) group may include at least one selected from a group consisting of nitric acid, amylnitrate, lithium nitrate, and potassium nitrate. The compound including the nitrile (—CN) group may include at least one selected from a group consisting of methane nitrile, benzonitrile, acrylonitrile, and methacrylonitrile. The compound including the alkoxy (—OR, wherein R is a C1 to C20 aliphatic organic group) group may include at least one selected from a group consisting of lithium methoxide, sodium methoide, lithium ethoxide, sodium, and ethoxide.

The fuel cell separator precursor may be immersed into the compound with the hydrophilic functional group for approximately 5 minutes to approximately 300 minutes. The compound with the hydrophilic functional group has a concentration of approximately 0.5 M to approximately 3 M.

Alternatively, the compound with the hydrophilic functional group may include a siliane compound including the hydrophilic functional group.

In this case, the fuel cell separator precursor may be immersed into the siliane compound including the hydrophilic functional group.

Alternatively, the fuel cell separator precursor may be coated with a composition including the silane compound.

The composition including the silane compound may include at least one solvent selected from a group consisting of water, and an organic solvent, The organic solvent may be at least one selected from a group consisting of an alcohol solvent, a cellosolve solvent, dimethyl formamide, and an organic solvent having compatibility with water. The composition including the silane compound may have a concentration ranging from approximately 5 mM to approximately 500 mM.

Before forming the hydrophilic surface-treatment layer on the bottom surface of the flow channel, the fuel cell separator precursor may be pretreated with at least one method selected from a group consisting of radiating polarization, plasma treatment, sand papering, corona treatment, and rubbing.

Before forming the hydrophilic surface-treatment layer on the bottom surface of the flow channel, the side and top surfaces of the cell barriers may be masked with a masking tape.

An ultrasonic wave treatment may be performed on the main body while washing the main body formed with the hydrophilic surface-treatment layer.

The process of drying the main body formed with the hydrophilic surface-treatment layer may be performed under a reduction atmosphere comprising at least one selected from a group consisting of nitrogen and argon, at a temperature ranging from approximately 20° C. to approximately 50° C.

Hereinafter, further aspects will be described in detail.

In the fuel cell as constructed according to the principles of the present invention, moisture is frozen at the bottom surface of the flow channel but not in the fuel cell during storage and operation of the fuel cell under a temperature of 0° C., so operation failure caused by clogged micropores of the fuel cell due to freezing and mechanical failure of the fuel cell by cell volume expansion due to freezing may be prevented. In addition, during the operation under normal conditions, moisture may be effectively discharged so that the fuel cell is effectively operated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
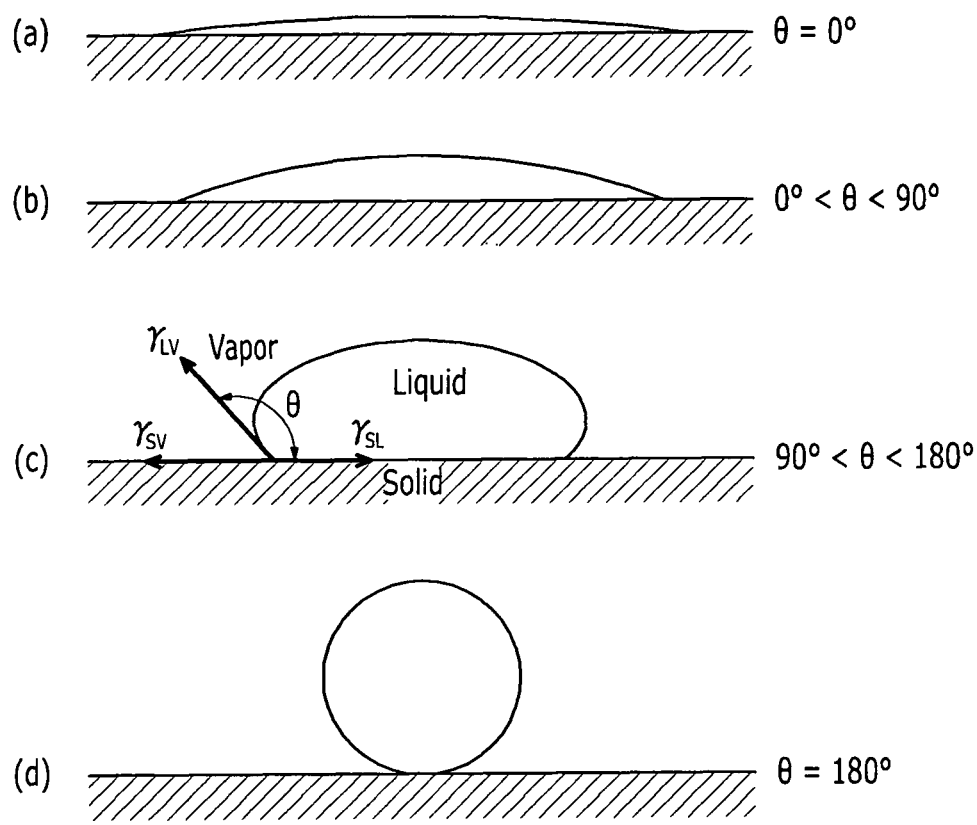
FIGS. 1(a) through (d) are schematic drawings illustrating a contact angle of a substrate.

A fuel cell in hydrophilic functional group includes a stack composed of unit cells, and produces various ranges of power output. Since the fuel cell has an energy density four to ten times higher than a small lithium battery, the fuel cell has been highlighted as a small portable power source.

Typical examples of fuel cells are polymer electrolyte membrane fuel cells (PEMFC) and direct oxidation fuel cells (DOFC). A direct oxidation fuel cell that uses methanol as a fuel is called a direct methanol fuel cell (DMFC).

The polymer electrolyte fuel cell has an advantage of high energy density and high power, but the polymer electrolyte fuel cell also has problems in the need to carefully handle hydrogen gas and the requirement of accessory facilities, such as a fuel reforming processor for reforming methane, methanol, natural gas, and the like, in order to produce hydrogen as the fuel gas.

On the contrary, a direct oxidation fuel cell has an energy density lower than that of the polymer electrolyte fuel cell, but the direct oxidation fuel cell has advantages of easy handling of a fuel, being capable of operating at room temperature due to its low operation temperature, and no need, for additional fuel reforming processors.

In the above-mentioned fuel cell system, the stack that generates electricity substantially includes several to scores of unit cells stacked adjacent to one another, and each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

A fuel is supplied to an anode and adsorbed on catalysts of the anode, and the fuel is oxidized to produce protons and electrons. The electrons are transferred into a cathode via an external circuit, and the protons are transferred into the cathode through the polymer electrolyte membrane. In addition, an oxidant is supplied to the cathode, and then the oxidant, protons, and electrons are reacted on catalysts of the cathode to produce electricity along with water.

Exemplary embodiments of the present invention will hereinafter be described in detail referring to the following accompanied drawings and can be easily performed by those who have common knowledge in the related field. However, these embodiments are only exemplary, and the present invention is not limited thereto.

As used herein, when specific definition is not otherwise provided, the term "aliphatic" may refer to a C1 to C20 alkyl group, a C2 to C20 alkenyl group, or a C2 to C20 alkynyl group. In one embodiment, the term "aliphatic" may refer to a C1 to C15 alkyl group, a C2 to C15 alkenyl group, or a C2 to C15 alkynyl group, while in another embodiment, the term "aliphatic" may refer to a C1 to C10 alkyl group, a C2 to C10 alkenyl group, or a C2 to C10 alkynyl group.

The fuel cell separator constructed as one embodiment according to the principles of the present invention has a hydrophilic surface-treatment layer in a certain region, so the difference between hydrophilicity and hydrophobicity will be described first.

Whether a surface of a substrate is hydrophilic or hydrophobic is determined by quantitatively measuring a contact angle of the surface of the substrate. In the present specification and the claims, the term "contact angle" refers to the angle at which water interface meets a solid interface at room temperature, which is measured by image analysis through a charge-coupled device (CCD) camera after dripping a water drop having a size of about 8 μl onto the subject substrate. The same process is repeated several times, and the average is calculated from the water contact angle to obtain a contact angle.

The relationship between the contact angle of a substrate and the hydrophilicity and hydrophobicity of the substrate is simply described with reference to FIG. 1.

As shown in FIG. 1 (a) to (d), the contact angle is measured at the contact point between the end point of a curved line of a water drop (liquid) and the solid surface on the liquid-solid-gas contact surface. Accordingly, the contact angle θ is 0° in FIG. 1 (a); the contact angle θ is 0°≤θ≤90° in FIG. 1 (b); the contact angle θ is 90°≤θ≤180° in FIG. 1 (c); and the contact angle θ is 180° in FIG. 1 (d). In this case, a hydrophobic surface refers to a surface having a contact angle of 90° or more, and a hydrophilic surface refers to a surface having a contact angle of 90° or less.

Generally, a separator separates membrane-electrode assemblies from each other in a fuel cell and supplies an oxidizing agent and a fuel required for the electrochemical reaction into an anode and a cathode of each membrane-electrode assembly. The separator also plays a role of a passage for discharging water and carbon dioxide produced by the electrochemical reaction. In addition, the separator also prevents explosion and combustion due to the direct contact of reactants of fuel and the oxidizing agent. Thereby, the substrate for a separator desirably includes a material having low reactant transmittance and excellent electron conductivity for actively transmitting electrons.

When the fuel or oxidizing agent is not smoothly supplied, or when the reaction products such as water or carbon dioxide are hardly discharged in the separator, the fuel cell fails to operate or the output characteristic of the fuel cell is deteriorated. These problems may be serious in a cold start-up.

According to one aspect of the present invention, a fuel cell separator is provided that includes a main body including a plurality of cell barriers and a flow channel disposed between the cell barriers, and a hydrophilic surface-treatment layer disposed on the bottom surface of the flow channel of the main body. The hydrophilic surface-treatment layer formed on the bottom surface flow channel has a contact angle less than a contact angle of a side surface of at least one cell barrier by about 10° to about 60°. For example, the contact angle of the hydrophilic surface-treatment layer formed on the bottom surface of the flow channel may be less than the contact angle of the side surface of the cell barrier by about 15° to about 40°.

The fuel cell separator includes the hydrophilic surface-treatment layer on the bottom surface of the flow channel of the main body, so the moisture is frozen only on the bottom surface of the flow channel during storage and operation of the fuel cell under a temperature of 0° C., so as to facilitate the supply of oxidizing agent and fuel into the anode and the cathode. In addition, the discharge of reaction products generated from the electrochemical reaction in the fuel cell is facilitated, so as to easily operate the fuel cell and to improve the battery characteristic of the fuel cell.

When the difference between the contact angle of the hydrophilic surface-treatment layer disposed on the bottom surface of the flow channel and the contact angle of the side surface of the cell barrier is within the above range, the moisture may be selectively frozen on the bottom surface of the flow channel during storage and operation under a temperature of 0° C., so it may prevent the mechanical failure and the operation failure of the fuel cell. In addition, the moisture is uniformly distributed in the flow channel during the operation under normal conditions to effectively discharge the moisture and to effectively operate the fuel cell.

Figure 2:
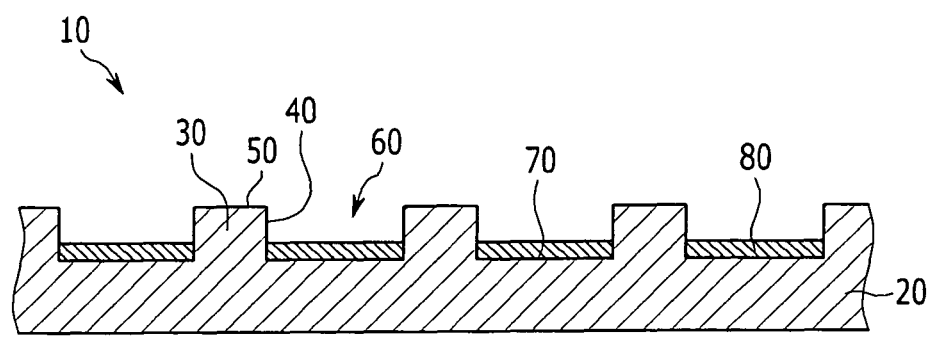
FIG. 2 is a schematic cross-sectional view showing a separator constructed as one embodiment according to the principles of the present invention.

Hereinafter, a fuel cell separator constructed as one embodiment according to the principles of the present invention is described in more detail with reference to FIG. 2. FIG. 2 is a schematic cross-sectional view showing a fuel cell separator constructed as one embodiment according to the principles of the present invention.

Referring to FIG. 2, a fuel cell separator 10 constructed as one embodiment according to the principles of the present invention includes a main body 20 including a plurality of cell barriers 30 and a flow channel 60 disposed between cell barriers 30, and a hydrophilic surface-treatment layer 80 disposed on a bottom surface 70 of flow channel 60. Hydrophilic surface-treatment layer 80 is present only on bottom surface 70 of flow channel 60 but is not present on a side surface 40 and a top surface 50 of cell barrier 30.

Main body 20 plays a role of a conductor for connecting an anode and a cathode in series, and a supporter of fuel cell separator 10. On the surface of main body 20, flow channel 60 is provided to supply an oxidizing agent and a fuel into the anode and the cathode of the membrane-electrode assembly.

Main body 20 may include a metal, graphite, a carbon-resin composite, or a combination thereof. The metal may be stainless steel, aluminum, titanium, copper, or an alloy thereof. The carbon-resin composite may include a composite including a carbon such as graphite, and a resin selected from the group consisting of an epoxy-based resin, an ester-based resin, a vinyl ester-based resin, tetrafluoroethylene (TEFLON) resin, polyvinylidene fluoride resin, fluoroethylene propylene resin, and a urea resin. However, the main body according to one embodiment of the present invention is not limited thereto.

In order to easily provide a hydrophilic surface-treatment layer, the surface of main body 20 may be pretreated by a method selected from the group consisting of radiating polarization, plasma treatment, sand papering, corona treatment, rubbing, and a combination thereof. The process of pretreating the surface of main body 20 either changes the surface morphology of main body 20, or slightly increase the surface roughness of main body 20.

Flow channel 60 is disposed between cell barriers 30 of main body 20.

The side surface 40 of cell barrier 30, top surface 50 of cell barrier 30 may be generally hydrophobic. However, although it is not shown in FIG. 2, side surface 40 of cell barrier 30, top surface 50 of cell barrier 30, or both of side surface 40 and top surface 50 of cell barrier 30 may be subjected to an additional hydrophobic surface treatment. For example, side surface 40 of cell barrier 30, top surface 50 of cell barrier 30, or both of side surface 40 and top surface 50 of cell barrier 30 may be formed with a hydrophobic surface-treatment layer.

Side surface 40 of cell barrier 30, top surface 50 of cell barrier 30, or both of side surface 40 and top surface 50 of cell barrier 30 may have a contact angle ranging from about 90° to about 160°. When side surface 40 of cell barrier 30 top surface 50 of cell barrier 30, or both of side surface 40 and top surface 50 of cell barrier 30 have the contact angle within the range, moisture is maintained on side surface 40 of cell barrier 30, top surface 50 of cell barrier 30, or both of side surface 40 and top surface 50 of cell barrier 30.

The hydrophobic surface-treatment layer may include a hydrophobic functional group.

The hydrophobic functional group is a functional group including $CH_2$, $CF_2$, CRH, $CR_2$ (wherein R is C1 to C20 aliphatic organic group, for example, a C1 to C20 alkyl group), or a combination thereof, but is not limited thereto. For example, the hydrophobic functional group may be a functional group including ethylene, fluoroethylene, propylene, isopropylene, or a combination thereof, but is not limited thereto.

Hydrophilic surface-treatment layer 80 is disposed on bottom surface 70 of flow channel 60 of main body 20. Hydrophilic surface-treatment layer 80 includes a hydrophilic functional group to selectively freeze the moisture only on hydrophilic surface-treatment layer 80, so that the oxidizing agent and fuel are smoothly supplied into the anode and the cathode. In addition, hydrophilic surface-treatment layer 80 facilitates the discharge of reaction products of carbon dioxide and water to accelerate the oxidation of the fuel and the reduction of the oxidizing agent.

Hydrophilic surface-treatment layer 80 included in fuel cell separator 10 may have a contact angle ranging from about 0° to about 85°. When hydrophilic surface-treatment layer 80 has a contact angle within the range, the moisture is easily removed when operating under normal conditions, and the moisture is selectively frozen only on hydrophilic surface-treatment layer 80 disposed on bottom surface 70 of flow channel 60 during storage and operation under a temperature of 0° C. For example, hydrophilic surface-treatment layer 80 included in fuel cell separator 10 may have a contact angle ranging from about 40° to about 85°.

A hydrophilic functional group included in the hydrophilic surface-treatment layer may include a hydroxy (—OH) group, a carboxyl (—COOH) group, an amine (—$NH_2$) group, a ketone (—CO—) group, an aldehyde (—CHO) group, a sulfonic acid (—$SO_3H$) group, a nitrate (—$NO_3$) group, a nitrile (—CN) group, an alkoxy (—OR, wherein R is a C1 to C20 aliphatic organic group) group, or a combination thereof, but is not limited thereto.

Hydrophilic surface-treatment layer 80 is formed on bottom surface 70 of flow channel 60 by adhering a hydrophilic functional group or a functional group including the hydrophilic functional group, and hydrophilic surface-treatment layer 80 may have a thickness ranging from about 1 nm to about 100 nm. Thereby, hydrophilic surface-treatment layer 80 may have an average thickness ranging from about 1 nm to about 100 nm, but is not limited thereto.

Hereinafter, a method for manufacturing the fuel cell separator will be described.

First, a fuel cell separator precursor constructed with the plurality of cell barriers in the main body and a flow channel between the cell barriers, is prepared. Then, the separator precursor is treated with a compound including a hydrophilic functional group to provide a hydrophilic surface-treatment layer on the desirable region of the flow channel, for example, the bottom surface of the flow channel. The resulting product may be washed with water and dried.

Before forming the hydrophilic surface-treatment layer, the region where the hydrophilic surface-treatment layer is not required to be formed, for example, the side surface and the top surface of the cell barrier, are masked using a masking tape.

After forming the hydrophilic surface-treatment layer on the desired region, the masking tape is removed from the side surface and the top surface of cell barrier, so that the hydrophilic surface-treatment layer is formed only on the bottom surface of the flow channel as required.

In order to facilitate the forming of the hydrophilic surface-treatment layer, the surface of main body 20 may be pretreated with a method selected from the group consisting of radiating polarization, plasma treatment, sand papering, corona treatment, rubbing, and a combination thereof.

The surface pretreatment of main body may be performed before forming a flow channel of the main body. Alternatively, the flow channel may be formed on the main body before performing the surface treatment to the main body.

Subsequently, a hydrophilic surface-treatment layer may be formed on the desirable region of the main body formed with the flow channel by treating the main body with a compound with a hydrophilic functional group.

The compound with the hydrophilic functional group may be an acid compound such as sulfuric acid, nitric acid, phosphoric acid, hydrochloric acid, or a combination thereof; a compound including a functional group such as a hydroxy (—OH) group, a carboxyl (—COOH) group, an amine (—$NH_2$) group, a ketone (—CO—) group, an aldehyde (—CHO) group, a sulfonic acid (—$SO_3H$) group, a nitrate (—$NO_3$) group, a nitrile (—CN) group, an alkoxy (—OR, wherein R is a C1 to C20 aliphatic organic group) group, or a combination thereof; or a combination, but it is not limited thereto.

The exemplary of the compound including the hydroxyl (—OH) group may be hydrogen peroxide ($H_2O_2$), water, sodium hydroxide, potassium hydroxide or a combination thereof; the exemplary of the compound including the carboxyl (—COOH) group may be acrylic acid, acetic acid, methacrylic acid, itaconic acid, or a combination thereof; the exemplary of the compound including the amine (—$NH_2$) group may be ammonia, methyl amine, propyl amine, N-methyl-N-ethyl amine, N-ethyl amine, N-methyl-N-propyl amine, or a combination thereof; the exemplary of the compound including the keton (—CO—) group may be cyclopropanone, 3-butene-2-one or a combination thereof; the exemplary of the compound including the aldehydeo (—CHO) group may be methylacryl aldehyde, formaldehyde, ethanol, cinnamaldehyde, or a combination thereof; the exemplary of the compound including the sulfonic acid (—$SO_3H$) group may be sulfuric acid, trifluoromethane sulfonic acid, benzene sulfonic acid, a combination thereof; the exemplary of the compound including the nitrate (—$NO_3$) group may be nitric acid, amylnitrate, lithium nitrate, potassium nitrate, or a combination thereof; the exemplary of the compound including the nitrile (—CN) group may be methane nitrile, benzonitrile, acrylonitrile, methacrylonitrile, or a combination thereof; the exemplary of the compound including the alkoxy (—OR, wherein R is a C1 to C20 aliphatic organic group) group may be lithium methoxide, sodium methoide, lithium ethoxide, sodium, ethoxide, or a combination thereof. However, the compounds are not limited thereto.

When the hydrophilic surface-treatment is performed using the acid compound, i.e., an acid-treatment, the acid-treatment includes immersing the separator precursor into an acid or coating the separator precursor with the acid. The acid is not limited, but the exemplary may include nitric acid, sulfuric acid, hydrochloric acid, phosphoric acid, or a combination thereof. The concentration of the acid is not limited, but may be about 0.5M to about 3M. When the concentration of the acid falls into the above range, a hydrophilic surface-treatment layer may be readily formed on the desirable region of the flow channel, for example, the bottom surface of the flow channel. Furthermore, when the acid has the concentration within the range, a uniform hydrophilic surface-treatment layer may be provided, and the thickness of the hydrophilic surface-treatment layer may be easily controlled.

The time required for immersion may be suitably controlled according to the concentration of the acid, but may be about 5 minutes to about 300 minutes. When the immersion time falls into the above range, a suitable hydrophilic surface-treatment layer may be formed on the desirable region of the flow channel, for example, the bottom surface of the flow channel.

The hydrophilic surface-treatment using the compound including the hydrophilic functional group may be performed by immersing the separator precursor into a composition including the compound, or coating the separator precursor with the composition. The concentration of the compound and the immersing time are the same to the acid-treatment. The composition include the compound may include a solvent such as water.

In another embodiment, the compound including the hydrophilic functional group may be silane compound including the hydrophilic functional group. If the silane compound is used, the hydrophilic surface-treatment may be performed by immersing or coating technique. The coating technique may be performed by coating a composition including the silane compound on the desirable region of the separator precursor.

The composition may include a solvent such as water, an organic solvent, or a combination thereof. The organic solvent may be an alcohol solvent such as methanol, ethanol, propanol, butanol, or the like; a cellosolve solvent such as methyl cellosolve or the like; dimethyl formamide; an organic solvent having compatibility with water such as acetones or the like, but is not limited thereto. Two or more kinds of these organic solvents may be mixed.

The composition including the silane compound having a hydrophilic functional group may have a concentration ranging from about 5 mM to about 500 mM, for example, a concentration ranging from about 5 mM to about 20 mM.

When the composition including a compound having a hydrophilic functional group has the concentration within the range, it may provide a uniform hydrophilic surface-treatment layer, and it may easily control the thickness of the hydrophilic surface-treatment layer.

Then the main body formed with the hydrophilic surface-treatment layer is washed and dried to provide a fuel cell separator.

The washing process may be performed by using toluene, acetone, or a combination thereof, for example, by using toluene, but is not limited thereto.

In addition, it is preferable to perform the washing process together with an ultrasonic wave treatment. By performing the washing process together with the ultrasonic wave treatment, impurities are more easily removed to provide a single layer of the hydrophilic surface-treatment layer.

In addition, the drying process may be performed under a reduction atmosphere such as with nitrogen, argon, or a combination thereof. A reduction atmosphere is an atmospheric condition in which oxidation is prevented by removal of oxygen and other oxidizing gases or vapors.

The drying process may be performed at a temperature ranging from about 20° C. to about 50° C., for example, a temperature ranging from about 40° C. to about 50° C. When the main body is dried in the above temperature range, a uniform hydrophilic surface-treatment layer may be provided, the drying process is not excessively prolonged and the solvent is not evaporated within a short duration.

The fuel cell separator includes a hydrophilic surface-treatment layer, so the moisture is frozen only on the bottom surface of the flow channel during storage and operation under a temperature of 0° C. Thereby, the supply of the oxidizing agent and the fuel into the anode and the cathode may be facilitated. In addition, the discharge of reaction products resulting from an electrochemical reaction of the fuel cell may be facilitated, so the fuel cell may be easily operated and the battery characteristics of the fuel cell are improved.

In addition, the separator may be used at a position of at least one electrode of the anode and the cathode of the fuel cell. That is, the separator may be disposed at a side, of the membrane-electrode assembly formed with the anode; or, alternatively, the separator may be disposed at a side of the membrane-electrode assembly formed with the cathode. The separator may be used at a position of the cathode since the hydrophilic surface-treatment layer facilitates the discharge of reaction products and the supply of oxidant.

The output characteristic improvement of the fuel cell due to the acceleration of the oxidation of the fuel and the reduction of the oxidizing agent in the separator is further maximized in the polymer electrolyte fuel cell.

As described above, a hydrophobic surface-treatment layer may be formed on the side surface of the cell barrier, the top surface of the cell barrier, or the side surface and the top surface of the cell barrier in the fuel cell separator. The method of manufacturing the hydrophobic surface-treatment layer has the same primary principals as the method of manufacturing a hydrophilic surface-treatment layer, which is easily understood by a person of ordinary skill in the art, so the detailed descriptions are omitted.

The fuel cell system according to one embodiment includes at least one electrical generator, a fuel supplying part, and an oxidizing agent supplying part. The electrical generator includes a membrane-electrode assembly and a separator disposed on both surfaces of the membrane-electrode assembly. The separator is the same as above. In other words, the separator includes a main body including a plurality of cell barriers and a flow channel disposed between the cell. barriers, and a hydrophilic surface-treatment layer disposed on the bottom surface of the flow channel of the main body. The hydrophilic surface-treatment layer disposed on the bottom surface of the flow channel has a lesser contact angle than the contact angle of the side surface of the cell barrier by about 10° to about 60°.

For example, the electrical generator is to generate electricity through the oxidation of the fuel and the reduction of the oxidizing agent, and includes a membrane-electrode assembly and a separator (also called as a bipolar plate) disposed on both surfaces of the membrane-electrode assembly. The electrical generator may be included in a fuel cell in a stack structure in which one or more thereof are stacked, if required. The number of stacked electrical generators may be adjusted according to the required output voltage.

The membrane-electrode assembly includes an anode and a cathode facing each other, and a polymer electrolyte membrane between the anode and the cathode.

The polymer electrolyte membrane plays a role of exchanging ions by transferring protons produced at an anode catalyst layer to a cathode catalyst layer. The polymer electrolyte membrane may include a polymer resin having excellent proton conductivity. For example, a polymer resin having a cation exchange group selected from a sulfonic acid group, a carboxylic acid group, a phosphoric acid group, a phosphonic acid group, or derivatives thereof at its side chain may be included. Further, the cation exchange resin preferably has an ion-exchange ratio ranging from 3 to 33, and an equivalent weight (EW) ranging from 700 to 2000. The term "ion exchange ratio of the ion exchange resin" is defined to be determined by the number of carbons in the polymer backbone and the number of cation exchange groups. The ion-exchange ratio ranging from 3 to 33 corresponds to an equivalent weight ranging from 700 to 2000.

Examples of the polymer resin include at least one proton conductive polymer selected from perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a sulfonic acid group-containing copolymer of tetrafluoroethylene and fluorovinylether, polyetherketone sulfide, aryl ketone, poly(2,2'-(m-phenylene)-5,5'-bibenzimidazole), or poly(2,5-benzimidazole). However, the polymer electrolyte membrane is not limited thereto.

The anode and cathode are disposed on both sides of the polymer electrolyte membrane.

The anode includes a catalyst layer and an electrode substrate for fuel transfer. At the catalyst layer of the anode, the fuel is supplied through a separator to produce electrons and protons by an oxidation reaction of the fuel. The cathode also includes a catalyst layer and an electrode substrate for oxidant transfer. At the catalyst layer of the cathode, an oxidant supplied through a separator reacts with protons supplied through a polymer electrolyte membrane to produce water by an oxidant reduction reaction.

The catalyst layers of the anode and cathode catalytically help fuel oxidation and oxidant reduction reactions. In one embodiment, a metal catalyst is included. The metal catalyst may be at least one selected from platinum, ruthenium, osmium, a platinum-ruthenium alloy, a platinum-osmium alloy, a platinum-palladium alloy, a platinum-M alloy, or a platinum-palladium-M alloy, where M is a metal at least one selected from Ga, Ti, V, Sn, W, Rh, Mo, Cr, Mn, Fe, Co, Ni, Cu, or Zn. In one embodiment, it may be selected from Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, or Pt/Ru/Sn/W. The anode and the cathode may include the same catalyst. However, in a direct oxidation fuel cell, since an anode catalyst may be poisoned by CO, a CO-tolerant platinum-ruthenium alloy catalyst may be suitably used as an anode catalyst.

Such a catalyst may be used while being supported on a carrier. The 13, carrier may include carbon-based materials such as acetylene black, graphite, or the like, or an inorganic material particulate such as alumina, silica, zirconia, titania, or the like. A noble metal supported on a carrier may be a commercially available one or can be prepared by supporting a noble metal on a carrier. The method of supporting a noble metal on a carrier is well-known in this related field and a detailed description thereof is omitted.

The electrode substrates support the anode and cathode and provide a path for transferring the fuel and oxidant to catalyst layers. In one embodiment, the electrode substrates are formed from a material such as carbon paper, carbon cloth, carbon felt, or a metal cloth (a porous film composed of metal fiber or a metalized polymer film disposed on a surface of a cloth composed of polymer fibers). The electrode substrate is not limited thereto.

The electrode substrates may be treated with a fluorine-based resin to be water-repellent to prevent deterioration of diffusion efficiency due to water generated during operation of a fuel cell. The fluorine-based resin may be one selected from the group consisting of polyvinylidene fluoride, polytetrafluoroethylene, fluorinated ethylene propylene, polychlorotrifluoroethylene, a fluoroethylene polymer, and mixtures thereof.

In order to increase reactant diffusion effects between the electrode substrates and catalyst layer, the anode or cathode may further include a microporous layer on an electrode substrate. The microporous layer is formed by coating a composition including a conductive powder material, a binder, or an ionomer as needed. Examples of the conductive powder may include carbon powder, carbon black, acetylene black, activated carbon, or nanocarbons such as carbon nanotubes, carbon nanofiber, carbon nanowire, carbon nanohorns, carbon nanorings, or combinations thereof.

Separators are respectively positioned at opposite sides of the membrane-electrode assembly described above. The separator is the same as described above.

The fuel supplier plays a role of supplying the electricity generating element with a fuel including hydrogen, and the oxidant supplier plays a role of supplying the electricity generating element with an oxidant. The oxidant includes oxygen or air.

The fuel includes liquid or gaseous hydrogen, or a hydrocarbon-based fuel. Examples of the hydrocarbon-based fuel include methanol, ethanol, propanol, butanol, or natural gas.

Figure 3:
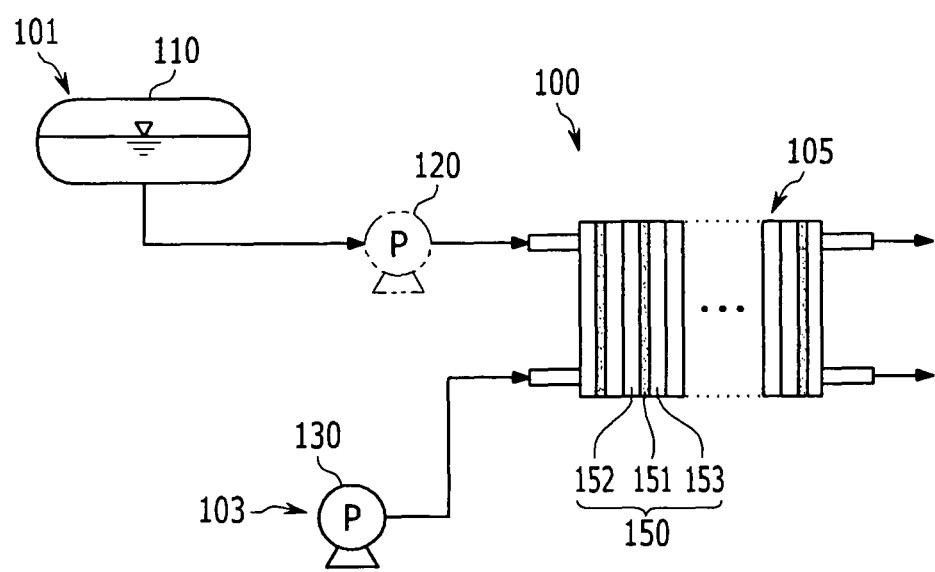
FIG. 3 is a schematic view showing a fuel cell system constructed as one embodiment according to the principles of the present invention.

FIG. 3 shows a schematic structure of a fuel cell system 1 that will be described in detail with reference to this accompanying drawing as follows. FIG. 3 illustrates a fuel cell system wherein a fuel and an oxidant are provided to an electricity generating element through pumps 120 and 130, but the present invention is not limited to such structures. The fuel cell system of the present invention alternatively includes a structure wherein a fuel and an oxidant are provided in a diffusion manner.

Fuel cell system 100 includes a stack 105 including at least one electricity generating element 150 that generates electrical energy through an electrochemical reaction of a fuel and an oxidant, a fuel supplier 101 for supplying the fuel to electricity generating element 150, and an oxidant supplier 103 for supplying the oxidant to electricity generating element 150.

In addition, fuel supplier 101 is equipped with a tank 110, which stores fuel, and optionally a fuel pump 120, which is connected therewith. Fuel pump 120 supplies the fuel stored in tank 110 with a predetermined pumping power.

Oxidant supplier 103, which supplies the oxidant to electricity generating element 150 of stack 105, is equipped with at least one pump 130 for supplying the oxidant with a predetermined pumping power.

Electricity generating element 150 includes a membrane-electrode assembly 151 that oxidizes hydrogen or a fuel and reduces an oxidant, and separators 152 and 153 that are respectively positioned at opposite sides of membrane-electrode assembly 151 and that supply hydrogen or a fuel, and an oxidant to membrane-electrode assembly 151.

EXAMPLES

The following examples illustrate the present invention in more detail. However, it is understood that the present invention is not limited by these examples.

Example 1

A catalyst composition for a cathode is prepared by adding a catalyst of Pt/C (47/53 (wt %/wt %)) into a solvent of which water and isopropyl alcohol are mixed in a weight ratio of 10:80. An ionomer of 10 wt % Nafion® (manufactured by DuPont) is added into the composition. The ionomer is added at 0.35 (weight ratio) based on the total amount of ionomer and catalyst.

A catalyst composition for an anode is prepared in accordance with the same procedure as in the catalyst composition for a cathode, except that the catalyst is PtRu/C (47/53 (wt %/wt %)).

With a polymer electrolyte membrane of Nafion, and the catalyst composition for a cathode and the catalyst composition for an anode are disposed on both surfaces of a polymer electrolyte membrane to provide a catalyst coated membrane (CCM) in which cathode and anode catalyst layers are bound to the polymer electrolyte layer. With cathode and anode diffusion layers of 35BC manufactured by SGL Carbon Group, a unit cell having an active area of 25 cm² is provided by disposing diffusion layers 35BC on both surfaces of the catalyst coated membrane (CCM) to which the catalyst layer for a cathode and the catalyst layer for an anode are bound to the polymer electrolyte layer.

A separator precursor including a main body made of stainless steel is prepared. The separator precursor is formed with a plurality of cell barriers and a flow channel disposed between the cell barriers. The main body has a contact angle of 95° on the side surface of the cell barrier. The flow channel formed between cell barriers has a triple serpentine structure in a depth of 1 mm and a width of 0.8 mm.

After masking the side surface and the top surface of the cell barrier of the stainless steel main body with a masking tape, the stainless steel main body is dipped in a 2M nitric acid solution for 20 minutes.

The hydrophilic surface-treatment layer is disposed on the bottom surface of the flow channel of the main body and has a contact angle of 80°. The contact angle is measured by image analysis through a charge-coupled device (CCD) camera after dripping a water drop having a size of about 8 μl onto the hydrophilic surface-treatment layer.

The hydrophilic surface-treatment layer has a thickness of about 30 nm, and has a hydroxyl (—OH) group and a nitrate (—$NO_3$) group.

The unit cell is assembled with a separator to a single cell.

Example 2

A single cell is fabricated in accordance with the same procedure as in Example 1, except that, after masking the side surface and the top surface of the cell barrier of the stainless steel main body with a masking tape, the stainless steel main body is dipped in a 2M nitric acid solution for 40 minutes. After the nitric acid solution treatment, the hydrophilic surface-treatment layer is disposed on the bottom surface of the flow channel of the main body and has a contact angle of 70° which is measured by the same procedure as in Example 1.

The hydrophilic surface-treatment layer has a thickness of about 30 nm, and has a hydroxyl (—OH) group and a nitrate (—$NO_3$) group.

Example 3

A single cell is fabricated in accordance with the same procedure as in Example 1, except that after masking the side surface and the top surface of the cell barrier of the stainless steel main body with a masking tape, the stainless steel main body is dipped in a 2M nitric acid solution for 10 minutes. After the nitric acid solution treatment, the hydrophilic surface-treatment layer is disposed on the bottom surface of the flow channel of the main body and has a contact angle of 84° which is measured by the same procedure as in Example 1.

The hydrophilic surface-treatment layer has a thickness of about 30 nm, and has a hydroxyl (—OH) group and a nitrate (—$NO_3$) group.

Example 4

A single cell is fabricated in accordance with the same procedure as in Example 1, except that after masking the side surface and the top surface of the cell barrier of the stainless steel main body with a masking tape, the stainless steel main body is dipped in a 2M nitric acid solution for 90 minutes. After the nitric acid solution treatment, the hydrophilic surface-treatment layer is disposed on the bottom surface of the flow channel and has a contact angle of 65° which is measured by the same procedure as in Example 1.

The hydrophilic surface-treatment layer has a thickness of about 30 nm, and has a hydroxyl (—OH) group and a nitrate (—$NO_3$) group.

Example 5

A single cell is fabricated in accordance with the same procedure as in Example 1, except that after masking the side surface and the top surface of the cell barrier of the stainless steel main body with a masking tape, the stainless steel main body is dipped in a 2M nitric acid solution for 300 minutes. After the nitric acid solution treatment, the hydrophilic surface-treatment layer is disposed on the bottom surface of the flow channel and has a contact angle of 45° which is measured by the same procedure as in Example 1.

The hydrophilic surface-treatment layer has a thickness of about 30 nm, and has a hydroxyl (—OH) group and a nitrate (—$NO_3$) group.

Comparative Example 1

A single cell is fabricated in accordance with the same procedure as in Example 1, except that the stainless steel main body is not treated with the nitric acid solution. The contact angle of bottom surface of flow channel is 95°, which is the same as in the front surface of the cell barrier.

Comparative Example 2

A single cell is fabricated in accordance with the same procedure as in Example 1, except that the stainless steel main body is subjected to the 2M nitric acid solution treatment without masking the side surface and the top surface of the cell barrier. Hydrophilic surface-treatment layers disposed on the bottom surface of the flow channel, on the side surface, and on the top surface of the cell barrier, have a contact angle of 80°, which is the same as in the side surface of the cell barrier which is measured by the same procedure as in Example 1.

The hydrophilic surface-treatment layers have a thickness of about 30 nm, and have a hydroxyl (—OH) group and a nitrate (—$NO_3$) group.

Comparative Example 3

A single cell is fabricated in accordance with the same procedure as in Example 1, except that the separator precursor made of stainless steel and have the contact angle of the side surface of the cell barrier of 165° is dipped in a 2M nitric acid solution for 30 minutes after masking the side surface and the top surface of the cell barrier with a masking tape. A surface-treatment layer disposed on the bottom surface of the flow channel has a contact angle of 120° which is measured by image analysis through a CCD (charge-coupled device) camera after dripping a water drop having a size of about 8 μl onto the surface-treatment layer.

The hydrophilic surface-treatment layers have a thickness of about 30 nm, and have a hydroxyl (—OH) group and a nitrate (—NO$_3$) group.

Comparative Example 4

A single cell is fabricated in accordance with the same procedure as in Example 1, except that the separator precursor made of stainless steel and have the contact angle of the side surface of the cell barrier of 95°, is dipped in a 2M nitric acid solution for 10 minutes after masking the side surface and the top surface of the cell barrier with a masking tape. A surface-treatment layer disposed on the bottom surface of the flow channel has a contact angle of 90°.

The hydrophilic surface-treatment layers have a thickness of about 30 nm, and have a hydroxyl (—OH) group and a nitrate (—NO$_3$) group.

Comparative Example 5

A single cell is fabricated in accordance with the same procedure as in Example 1, except that the separator precursor made of stainless steel and have the contact angle of the side surface of the cell barrier of 95°, and the main body is dipped in a 2M nitric acid solution for 300 minutes after masking the side surface and the top surface of the cell barrier with a masking tape. A surface-treatment layer disposed on the bottom surface of the flow channel has a contact angle of 30° which is measured by image analysis through a CCD (charge-coupled device) camera after dripping a water drop having a size of about 8 μl onto the surface-treatment layer.

The hydrophilic surface-treatment layers have a thickness of about 30 nm, and have a hydroxyl (—OH) group and a nitrate (—NO$_3$).

Experimental Example 1

Cold Start-Up Test

Each of the single cells obtained from Examples 1 to 5 and Comparative Examples 1 to 5 are subjected to a cold start-up test at −10° C. and −20° C.

In other words, each single cell is allowed to stand at each temperature for 5 hours to decrease the temperature, and then the air and hydrogen are supplied to the cathode and the anode, respectively, in stoichiometric amount (hydrogen supplying amount to anode/air supplying amount to cathode) of 2.5 to 1.2 to generate power at 7.8 A.

In the case of Comparative Example 1, the power generation is stopped when decreasing the battery power to 0.2V or less after 8 minutes when allowed to stand at −10° C., and the power generation is stopped when decreasing the battery power to 0.2V or less after 3 minutes when allowed to stand at −20° C. It is determined as "fail" when it is electrically generated at 7.8 A in the cold start-up test and the voltage is decreased to under 0.2 V within 10 minutes, or it is determined as "pass" when the voltage is at least maintained at 0.2 V. In the case of "pass", the voltage is indicated at 10 minutes.

The contact angle results of each component of Examples 1 to 5 and Comparative Examples 1 to 5 and the cold start-up results of each single cell obtained from the examples or comparative examples are shown in Table 1.

Experimental Example 2

Operation Test Under Normal Conditions at 60° C.

Each single cell obtained from Examples 1 to 5 and Comparative Examples 1 to 5 is subject to an operation test under normal conditions at 60° C.

The single cell is operated with an oxidant of air and H$_2$ fuel at 280 mA/cm$^2$ and at 60° C. for 10 hours. In this case, the stoichiometric of the cathode and anode fuel is 2.0 and 1.2, respectively:

Comparative Example 5 causes a water flooding phenomenon while operating at 280 mA/cm$^2$ at 60° C. for 1 hour and stops the operation when decreasing the battery voltage to under 0.2V. It is determined as fail when the voltage is decreased to under 0.2 V within 10 hours after operating at 60° C. at 280 mA/cm$^2$, or it is determined as pass when the voltage is at least maintained at 0.2V. In the case of "pass", the voltage is indicated at 2 hours.

Experiment 3

Measurement of the Contact Angle

The contact angle for the cathode and anode catalyst layer, the cathode and the anode diffusion layer, and the polymer electrolyte membrane used in Examples 1 to 5, and Comparative Examples 1 to 5, are measured by image analysis through a CCD (charge-coupled device) camera after dripping a water drop having a size of about 8 μl onto them. The results are shown in Table 1.

TABLE 1

| | Com. Example 1 | Com. Example 2 | Com. Example 3 | Com. Example 4 | Com. Example 5 | Example 1 | Example 2 | Example 3 | Example 4 | Example 5 |
|---|---|---|---|---|---|---|---|---|---|---|
| Cathode catalyst layer (°) | 151.3 | 151.3 | 151.3 | 151.3 | 151.3 | 151.3 | 151.3 | 151.3 | 151.3 | 151.3 |
| Anode catalyst layer (°) | 150.8 | 150.8 | 150.8 | 150.8 | 150.8 | 150.8 | 150.8 | 150.8 | 150.8 | 150.8 |
| Cathode diffusion layer (°) | 165.0 | 165.0 | 165.0 | 165.0 | 165.0 | 165.0 | 165.0 | 165.0 | 165.0 | 165.0 |
| Anode diffusion layer (°) | 165.0 | 165.0 | 165.0 | 165.0 | 165.0 | 165.0 | 165.0 | 165.0 | 165.0 | 165.0 |
| Polymer electrolyte membrane (°) | 74.7 | 74.7 | 74.7 | 74.7 | 74.7 | 74.7 | 74.7 | 74.7 | 74.7 | 74.7 |
| Side of cell barrier (°) | 95.0 | 80.0 | 165.0 | 95.0 | 95.0 | 95.0 | 95.0 | 95.0 | 95.0 | 95.0 |
| surface-treatment layer disposed on bottom of flow channel (°) | 95.0 | 80.0 | 120.0 | 90.0 | 30.0 | 80.0 | 70.0 | 84.0 | 65.0 | 45.0 |
| cold start-up (−10° C., V) | Fail | 0.45 | 0.41 | 0.43 | 0.62 | 0.52 | 0.61 | 0.54 | 0.63 | 0.62 |

TABLE 1-continued

|  | Com. Example 1 | Com. Example 2 | Com. Example 3 | Com. Example 4 | Com. Example 5 | Example 1 | Example 2 | Example 3 | Example 4 | Example 5 |
|---|---|---|---|---|---|---|---|---|---|---|
| Cold start-up (−20° C., V) | Fail | Fail | Fail | Fail | 0.53 | 0.43 | 0.47 | 0.45 | 0.50 | 0.51 |
| Normal condition operation (60° C., V) | 0.73 | 0.72 | 0.73 | 0.73 | Fail | 0.73 | 0.72 | 0.74 | 0.71 | 0.69 |

As shown in Table 1, it is confirmed that the fuel cells according to Examples 1 to 5 more effectively operate under the temperature of 0° C. compared to the fuel cells according to Comparative Examples 1 to 4.

As shown in Table 1, the fuel cell according to Comparative Example 5 is operated under the temperature of 0° C., but the moisture is hardly discharged when operating under the normal condition of 60° C. Thereby, the operation is stopped due to the water flooding phenomenon.

For example, the single cell obtained from Comparative Example 1 in which the bottom surface of the flow channel is not subjected to a hydrophilic treatment has a contact angle of both the side surface of the cell barrier and the bottom surface of the flow channel of 95°, so the operation fails at −10° C. and −20° C.

In the case of Comparative Example 2, the bottom surface of the flow channel has a contact angle of about 80° which is the same, but the side surface of the cell barrier has the same hydrophilicity as in the hydrophilic surface-treatment layer disposed on the bottom surface of the flow channel, so it may operate at −10° C. but fails to operate at −20° C.

In the case of Comparative Example 3, since the surface-treatment layer is formed only on the bottom surface of the flow channel, the contact angle of the surface-treatment layer disposed on the bottom surface of the flow channel is different from the contact angle of the side surface of the cell barrier. It is confirmed that it fails to operate at −20° C. since the surface-treatment layer disposed on the bottom surface of the flow channel has a contact angle of 120° which is not hydrophilic.

In the case of Comparative Example 4, since the surface-treatment layer is formed only on the bottom surface of the flow channel, the contact angle of the surface-treatment layer formed on the bottom surface of the flow channel is different from the contact angle of the side surface of cell barrier by about 5°. Thereby, it may operate at −10° C. but fails to operate at −20° C.

In the case of Comparative Example 5, since the hydrophilic surface-treatment layer is formed only on the bottom surface of the flow channel, the contact angle of the hydrophilic surface-treatment layer disposed on the bottom surface of the flow channel has a difference of about 65° from that of the contact angle of the side surface of the cell barrier, and it may operate at both −10° C. and −20° C. However, in the case of Comparative Example 5, it stops the operation due to the water flooding phenomenon when operating under the normal condition of 60° C., so it is impossible to be used as a fuel cell.

On the other hand, it is confirmed from Table 1 that all single cells obtained from Examples 1 to 5 in which the hydrophilic surface-treatment layer is formed only on the bottom surface of the flow channel, and the contact angle of the hydrophilic surface-treatment layer formed on the bottom surface of the flow channel is less than the contact angle of the side surface by about 10° to about 60°, may operate at both −10° C. and −20° C. and may effectively operate under the normal condition of 60° C.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A separator for a fuel cell, comprising:
   a main body comprising a plurality of cell barriers and a flow channel disposed between the cell barriers; and
   a hydrophilic surface-treatment layer disposed on a bottom surface of the flow channel of the main body,
   the hydrophilic surface-treatment layer disposed on the bottom surface of the flow channel having a contact angle less than a contact angle of a side surface of the flow channel connecting at least one pair of the cell barriers by about 10° to about 60°.

2. The separator of claim 1, wherein the contact angle of the hydrophilic surface-treatment layer disposed on the bottom surface of the flow channel is less than the contact angle of the side surface by about 15° to about 40°.

3. The separator of claim 1, wherein the main body comprises at least one material selected from a group consisting of metal, graphite and a carbon-resin composite.

4. The separator of claim 1, wherein the main body is subjected to a surface-treatment in accordance with a method selected from a group consisting of UV radiating polarization, plasma treatment, sand papering, corona-treatment, rubbing, and a combination thereof.

5. The separator of claim 1, wherein the side surface of the flow channel and a top surface of the cell barrier is subjected to a hydrophobic surface treatment.

6. The separator of claim 1, wherein the side surface of the flow channel and a top surface of the cell barrier has a contact angle of approximately 90° to approximately 160°.

7. The separator of claim 1, wherein the hydrophilic surface-treatment layer has a contact angle of approximately 0° to approximately 85°.

8. The separator of claim 1, wherein the hydrophilic surface-treatment layer comprises at least one hydrophilic functional group selected from a group consisting of a hydroxy (—OH) group, a carboxyl (—COOH) group, an amine (—NH$_2$) group, a ketone (—CO—) group, an aldehyde (—CHO) group, a sulfonic acid (—SO$_3$H) group, a nitrate (—NO$_3$) group, a nitrile (—CN) group, and an alkoxy (—OR, wherein R is a C1 to C20 aliphatic organic group) group.

9. The separator of claim 1, wherein the hydrophilic surface-treatment layer has an average thickness ranging from 1 nm to 100 nm.

10. A fuel cell system, comprising:
    an electricity generating element generating electricity through electrochemical reactions of a fuel and an oxidant,
    the electricity generating element comprising:
    a membrane-electrode assembly including
    an anode, a cathode, and
a polymer electrolyte membrane interposed between the anode and cathode; and
a separator positioned at each side of the membrane-electrode assembly;
a fuel supplier supplying the electricity generating element with a fuel; and
an oxidant supplier supplying the electricity generating element with an oxidant, the separator comprising:
a main body comprising a plurality of cell barriers and a flow channel disposed between the cell barriers; and
a hydrophilic surface-treatment layer disposed on the bottom surface of the flow channel of the main body,
the hydrophilic surface-treatment layer disposed on the bottom surface of the flow channel has a contact angle less than a contact angle of a side surface of the flow channel connecting at least one pair of the cell barriers by about 10° to about 60°.

11. The fuel cell system of claim 10, wherein the contact angle of the hydrophilic surface-treatment layer disposed on the bottom surface of the flow channel is less than the contact angle of the side surface of the flow channel by about 15° to about 40°.

12. The fuel cell system of claim 10, wherein the main body comprises at least one material selected from a group consisting of a metal, graphite and a carbon-resin composite.

13. The fuel cell system of claim 10, wherein the main body is subjected to a surface-treatment in accordance with a method selected from a group consisting of UV radiating polarization, plasma treatment, sand papering, corona-treatment, rubbing, and a combination thereof.

14. The fuel cell system of claim 10, wherein the side surface of the flow channel and a top surface of cell barrier is subjected to a hydrophobic surface treatment.

15. The fuel cell system of claim 10, wherein at least one of the side surface of cell barrier and a top surface of cell barrier has a contact angle of approximately 90° to approximately 160°.

16. The fuel cell system of claim 10, wherein the hydrophilic surface-treatment layer has a contact angle of approximately 0° to approximately 85°.

17. The fuel cell system of claim 10, wherein the hydrophilic surface-treatment layer comprises at least one hydrophilic functional group selected from a group consisting of a hydroxy (—OH) group, a carboxyl (—COOH) group, an amine (—$NH_2$) group, a ketone (—CO—) group, an aldehyde (—CHO) group, a sulfonic acid (—$SO_3H$) group, a nitrate (—$NO_3$) group, a nitrile (—CN) group, and an alkoxy (—OR, wherein R is a C1 to C20 aliphatic organic group) group.

18. The fuel cell system of claim 10, wherein the hydrophilic surface-treatment layer has an average thickness ranging from 1 nm to 100 nm.

19. A method for manufacturing a separator for a fuel cell, the method comprising:
preparing a fuel cell separator precursor comprising a main body comprising a plurality of cell barriers and a flow channel disposed between the cell barriers;
forming a hydrophilic surface-treatment layer on a bottom surface of the flow channel; and
washing and drying the main body formed with the hydrophilic surface-treatment layer, with the hydrophilic surface-treatment layer disposed on the bottom surface of flow channel having a contact angle less than a contact angle of a side surface of the flow channel connecting at least one pair of the cell barriers by about 10° to about 60°.

* * * * *